US012573635B2

(12) United States Patent
Kim et al.

(10) Patent No.: US 12,573,635 B2
(45) Date of Patent: Mar. 10, 2026

(54) ANODE SLURRY COMPOSITION FOR SECONDARY BATTERY

(71) Applicant: HANSOL CHEMICAL CO., LTD., Seoul (KR)

(72) Inventors: Chang Beom Kim, Jeollabuk-do (KR); Sae Wook Oh, Jeollabuk-do (KR); Bo Ok Jang, Jeollabuk-do (KR); Shi Jin Song, Jeollabuk-do (KR); Ji Hye Park, Jeollabuk-do (KR); Go Eun Lee, Jeollabuk-do (KR); Hyeon Ji Gwon, Jeollabuk-do (KR); Jin Ju Eom, Jeollabuk-do (KR)

(73) Assignee: HANSOL CHEMICAL CO., LTD., Seoul (KR)

( * ) Notice: Subject to any disclaimer, the term of this patent is extended or adjusted under 35 U.S.C. 154(b) by 516 days.

(21) Appl. No.: 18/258,823

(22) PCT Filed: Dec. 22, 2020

(86) PCT No.: PCT/KR2020/018863
§ 371 (c)(1),
(2) Date: Jun. 22, 2023

(87) PCT Pub. No.: WO2022/139008
PCT Pub. Date: Jun. 30, 2022

(65) Prior Publication Data
US 2024/0047681 A1 Feb. 8, 2024

(51) Int. Cl.
*H01M 4/62* (2006.01)
*H01M 4/583* (2010.01)
(Continued)

(52) U.S. Cl.
CPC ........... *H01M 4/622* (2013.01); *H01M 4/583* (2013.01); *H01M 10/052* (2013.01); *H01M 2004/021* (2013.01); *H01M 2004/027* (2013.01)

(58) Field of Classification Search
CPC ............................. H01M 4/583; H01M 4/622
See application file for complete search history.

(56) References Cited

U.S. PATENT DOCUMENTS

2015/0079477 A1    3/2015 Spahr et al.
2019/0198878 A1*   6/2019 Annaka ............... H01M 4/1391

FOREIGN PATENT DOCUMENTS

CN    108847488 A    11/2018
CN    110212159 A    9/2019
(Continued)

OTHER PUBLICATIONS

Gregory V. Lowry et al., "Guidance to impove the scientific value of zeta-potential measurements in nanoEHS", Environmental Science Nano, Aug. 2016, 953-965.
(Continued)

*Primary Examiner* — Jonathan G Jelsma
(74) *Attorney, Agent, or Firm* — Leason Ellis LLP

(57) ABSTRACT

The present disclosure relates to an anode slurry composition for secondary batteries, comprising an anode active material; and a binder including a copolymer of (meth) acrylic acid monomer, acrylonitrile-based monomer, and (meth)acrylamide monomer, wherein a value obtained by dividing an absolute value of a zeta potential of the binder by an oxygen content per specific surface area of the anode active material is in a range from $0.6 \times 10^{-5}$ mV·m²/g to $2.0 \times 10^{-5}$ mV·m²/g.

13 Claims, 2 Drawing Sheets

(51) Int. Cl.
    H01M 10/052     (2010.01)
    *H01M 4/02*     (2006.01)

(56)            References Cited

FOREIGN PATENT DOCUMENTS

| | | | |
|---|---|---|---|
| EP | 3787078 | A1 | 3/2021 |
| JP | 2019526693 | A | 9/2019 |
| KR | 20140141861 | A | 12/2014 |
| KR | 20170076552 | A | 7/2017 |
| KR | 20170111748 | A | 10/2017 |
| KR | 20190133412 | A | 12/2019 |
| WO | WO-2018139868 | A1 * | 8/2018 .............. H01M 4/62 |
| WO | 2019208419 | A1 | 10/2019 |

OTHER PUBLICATIONS

David Fairhurst, "An Overview of the Zeta Potential—Part 2: Measurement", American Pharmaceutical Review, Apr. 1, 2013.
Anonymous: "Specific surface area—Wikipedia", retrived from the internet Apr. 26, 2021, https://en.wikipedia.org/wiki/Specific_surface_area.
European Search Report from EP Application No. EP 20216571 completed Apr. 27, 2021.
International Search Report from PCT Application No. PCT/KR2020/018863 completed Sep. 9, 2021.

\* cited by examiner

ANODE SLURRY COMPOSITION FOR SECONDARY BATTERY

CROSS-REFERENCE TO RELATED APPLICATIONS

This application is a U.S. National Stage Application under 35 U.S.C. § 371 of International Patent Application No. PCT/KR2020/018863, filed Dec. 22, 2020, the contents of which are each hereby incorporated by reference in its respective entirety.

TECHNICAL FIELD

Embodiments of the present disclosure relate to an anode slurry composition for secondary batteries including an anode active material and an anode binder.

BACKGROUND ART

In anode active materials, an amount of oxygen present on the surface varies depending on the type and manufacturing method thereof. When the amount of oxygen present on the surface of the anode active material is low, problems such as low phase stability and poor coating may occur in an aqueous slurry system. On the other hand, if the amount of oxygen is high, storage capacity increases, but a potential at which oxygen and lithium ions are reduced becomes higher than a potential at which oxygen and lithium ions are intercalated due to reaction between oxygen and lithium ions, and thus a large activation energy is required during intercalation/deintercalation of lithium ions, resulting in a degradation in cycle characteristics or a decrease in rate capability. In addition, a side reaction with an electrolyte solution occurs, thereby reducing electrical properties of the active material.

In addition, a binder is used in the prior art regardless of the amount of oxygen present on the surface of the anode active material, and thus stability of the anode slurry may be degraded or poor coating may occur. Accordingly, adhesion between the binder and the active material is degraded, thereby reducing battery life.

For example, Korean Patent Publication No. 2017-0111748 discloses an anode active material slurry including an anode active material containing an oxygen element in an amount of 1000 mg/kg or less, but there is no disclosure regarding a polarity of a binder polymer.

The present inventors prepared a slurry with improved adhesion characteristics and coating stability by adjusting an amount of oxygen present on a surface of an anode active material as well as a polarity of a binder polymer and confirmed that a secondary battery with improved rate capability and cycle characteristics may be prepared.

PRIOR ART

Patent Literature

Korean Patent Publication No. 2017-0111748

SUMMARY

The object of the present disclosure is to provide an anode slurry composition for secondary batteries improved in terms of phase stability and coating stability in an aqueous slurry system, thereby capable of improving battery life when using the anode slurry composition in electrode manufacturing.

The present invention provides an anode slurry composition for secondary batteries comprising an anode active material; and a binder including a copolymer of (meth) acrylic acid monomer, acrylonitrile-based monomer, and (meth)acrylamide monomer, wherein a value obtained by dividing an absolute value of a zeta potential of the binder by an oxygen content per specific surface area of the anode active material is in a range from $0.6 \times 10^{-5}$ mV·m²/g to $2.0 \times 10^{-5}$ mV·m²/g.

In addition, the present invention provides an anode for secondary batteries produced by using the anode slurry composition for secondary batteries.

In addition, the present invention provides a lithium secondary battery comprising: the anode for secondary batteries; a cathode; a separator disposed between the cathode and the anode; and an electrolyte.

The foregoing is illustrative only and is not intended to be in any way limiting. In addition to the illustrative aspects, embodiments and features described above, further aspects, embodiments and features will become apparent by reference to the drawings and the following detailed description.

Effects of the Invention

According to one or more embodiments of the present disclosure, an electrode slurry improved in terms of phase stability and coating stability in an aqueous slurry system may be prepared by adjusting an amount of oxygen present on a surface of an anode active material as well as a polarity of a binder polymer, thereby capable preparing a battery with improved rate capability, charge/discharge characteristics, and cycle characteristics by using the electrode slurry in electrode manufacturing.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1:
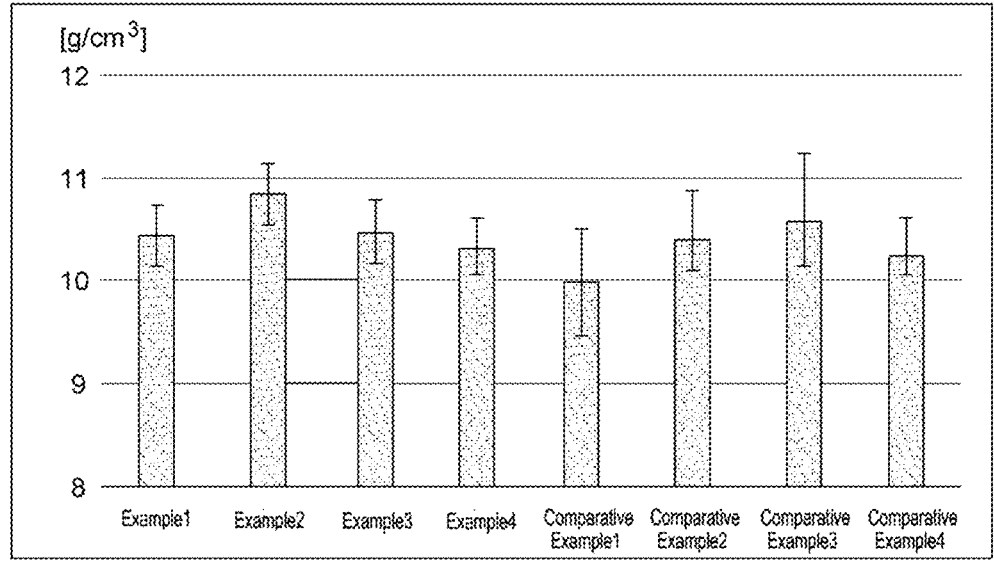
FIG. 1 is a graph illustrating a density of anodes prepared in Examples 1 to 4 and Comparative Examples 1 to 4.

Hereinafter, the present disclosure will be described in detail with reference to the accompanying drawings so that those of ordinary skill in the art may easily implement the present disclosure.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

In addition, throughout the specification, when a certain part "comprises", "includes", or "contains" a certain element, it means that other elements may be further included rather than excluding other components unless otherwise stated. In addition, throughout the specification, the term "above" or "on" means not only the case that an element is located on or beneath a target element, but also includes the case where there is another part interposed therebetween and does not necessarily mean that an element is located upwardly with respect to a direction of gravity.

One aspect of the present disclosure relates to an anode slurry composition for secondary batteries including: an anode active material; and a binder including a copolymer of (meth)acrylic acid monomer, acrylonitrile-based monomer, and (meth)acrylamide monomer, where a value obtained by dividing an absolute value of a zeta potential of the binder by an oxygen content per specific surface area of the anode active material is $0.6 \times 10^{-5}$ mV·m$^2$/g to $2.0 \times 10^{-5}$ mV·m$^2$/g.

The anode active material may be a carbon or graphite material.

As the carbon or graphite material, natural graphite, artificial graphite, expanded graphite, carbon fiber, non-graphitizable carbon, carbon black, carbon nanotube, fullerene, activated carbon, hard carbon or soft carbon may be used.

According to an embodiment, a graphite having an oxygen amount of $1.0 \times 10^{-4}$ g/m$^2$ to $4.0 \times 10^{-4}$ g/m$^2$ per specific surface area may be used as the anode active material.

An amount of the anode active material used in the anode slurry composition may be 90 to 99 parts by weight with respect to 100 parts by weight of the anode slurry composition.

In such a case, the amount of the anode active material refers to an amount of the anode active material in the anode slurry composition excluding water.

In an embodiment of the present disclosure, the (meth)acrylic acid monomer may be at least one monomer selected from the group consisting of acrylic acid, methacrylic acid, itaconic acid, fumaric acid, maleic acid, citraconic acid, methaconic acid, clutaconic acid, tetrahydrophthalic acid, crotonic acid, and isocrotonic acid.

An amount of the (meth)acrylic acid monomer may range from 0.5 to 10 wt %, and preferably 1 to 5 wt %, with respect to the total weight of the binder.

When the amount of the (meth)acrylic acid monomer satisfies the above range, stabilization and rheology of the slurry may be secured. In addition, when a film is formed after drying, it may act as a crosslinking or adhesive point to improve adhesion. When the amount of the (meth)acrylic acid monomer is high, reactivity with other monomers decreases and water-soluble poly(meth)acrylic acid is produced, which degrades slurry stability and adhesion.

In an embodiment of the present disclosure, the (meth)acrylonitrile-based monomer may be acrylonitrile, methacrylonitrile, or a combination thereof.

An amount of the (meth)acrylonitrile-based monomer may range from 0.5 to 5 wt %, and preferably 1 to 3 wt %, with respect to the total weight of the binder.

When the amount of the (meth)acrylonitrile-based monomer satisfies the above range, mobility of lithium ions may increase, thereby improving battery performance. When the amount of the (meth)acrylonitrile-based monomer is high, affinity with an electrolyte is improved and swelling of the electrolyte is increased, which reduces internal reaction and adhesion of the battery, resulting in a decrease in life.

In an embodiment of the present disclosure, the (meth)acrylamide monomer may be at least one monomer selected from the group consisting of acrylamide, methacrylamide, n-methylolacrylamide, and n-butoxymethylacrylamide.

An amount of the (meth)acrylamide monomer may range from 0.5 to 3 wt %, and preferably 1 to 2 wt %.

When the amount of the (meth)acrylamide monomer satisfies the above range, compatibility with carboxylmethylcellulose is increased to improve adhesion, and mobility of lithium ions may be improved to improve battery performance. If the amount of the (meth)acrylamide monomer is high, the slurry stability may be degraded.

In an embodiment of the present disclosure, the copolymer may be a copolymer of 0.5 to 10 wt % of the (meth)acrylic acid monomer; 0.5 to 3 wt % of the (meth)acrylamide monomer; and 0.5 to 5 wt % of the (meth)acrylonitrile-based monomer, with respect to the total weight of the binder.

As a method of forming the copolymer of the anode binder according to the present disclosure, emulsion polymerization, solution polymerization, suspension polymerization, bulk polymerization, ionic polymerization, radical polymerization, or living radical polymerization may be used, but emulsion polymerization is preferred by virtue of its excellent efficiency in the manufacturing process because the polymer is obtained in a state that it is dispersed in water and redistribution treatment is unnecessary.

The emulsion polymerization method is not particularly limited. For example, after adding water; additives such as dispersants, emulsifiers, and crosslinking agents; polymerization initiator; and monomers in respective controlled amounts in a sealed container with a stirrer and a heater attached, polymerization may be initiated by raising the temperature while stirring the mixture in the sealed container.

An amount of the emulsifier may be 1 to 10 parts by weight with respect to 100 parts by weight of the copolymer, a surfactant may be used as the emulsifier, and an anionic surfactant, a cationic surfactant, an amphoteric surfactant, and a nonionic surfactant may be used as the surfactant. Preferably, an anionic surfactant may be used. For example, as the anionic surfactant, higher fatty acid alkali salts, N-acrylic amino acid salts, alkyl ether carboxylic acid salts, acylated peptides, alkyl sulfonates, alkylbenzenes, alkyl amino acid salts, alkyl naphthalene sulfonates, sulfosuccinates, sulfated oil, alkyl sulfate, alkyl ether sulfate, alkyl aryl ether sulfate, alkyl amide sulfate, alkyl phosphate, alkyl ether phosphate or alkyl aryl ether phosphate, and the like may be used, and preferably sodium dodecylbenzene sulfonate may be used.

As the additive, for example, a chelating agent may be used. The chelating agent may be at least one selected from the group consisting of ethylenediaminetetraacetic acid, hydroxyethyldiatetraacetic acid, and propanediaminetetraacetic acid.

The initiator may be a decomposition initiator and a redox initiator, and preferably a decomposition initiator. The decomposition initiator may be at least one selected from the group consisting of potassium persulfate, ammonium persulfate, sodium hydrosulfite, potassium sulfite, sodium persulfate, and sodium bipersulfate.

The emulsion polymerization may be carried out at a temperature ranging from 20° C. to 100° C., preferably 30° C. to 90° C., and more preferably 35° C. to 80° C., for 30 minutes to 600 minutes, preferably 60 minutes to 400 minutes, and more preferably 120 minutes to 300 minutes.

The binder copolymer may have an absolute value of a zeta potential ranging from 5 to mV, and specifically 15 to 45 mV.

The "zeta potential" is an index indicating degree of surface charge of colloid particles suspended or dispersed in a medium (water and/or organic solvent). When an external electric field is applied to a colloid, colloid particles may move (migrate) in a direction opposite to a sign of a surface potential, and it is a value calculated considering a speed of the particle movement, an intensity of the applied electric field and hydrodynamic effects (solvent viscosity, permittivity).

The dispersion stability of colloidal particles suspended in a liquid is determined by a magnitude of the absolute value of the zeta potential. For example, when an electrode mixture composition is prepared, as the absolute value of the zeta potential of the electrochemical active material particles increases, a repulsive force between the particles increases, such that dispersibility and dispersion retention level are increased. On the other hand, when the absolute value of the zeta potential approaches zero, aggregation and sedimentation are facilitated by electrostatic attraction between particles, and a suspension of particles of an aqueous solution or an organic solution becomes unstable. Accordingly, the particles are liable to aggregate, and thus they directly affect densification and porosity of the electrode.

The present inventors have found that phase stability of the anode slurry composition is associated with the zeta potential of the binder and the oxygen content per specific surface area of the anode active material.

In an example of the present disclosure, a value obtained by dividing the absolute value of the zeta potential of the binder included in the anode slurry composition by the oxygen content per specific surface area of the anode active material is adjusted to be in a range from $0.6 \times 10^{-5}$ mV·m²/g to $2.0 \times 10^{-5}$ mV·m²/g.

According to the present disclosure, when the value obtained by dividing the absolute value of the zeta potential of the binder included in the anode slurry composition by the oxygen content per specific surface area of the anode active material is within the above range, not only anode adhesion and coating stability may be improved, but also charge/discharge characteristics and cycle characteristics may be improved.

In the case of using graphite as the anode active material, graphite with a low oxygen content per specific surface area improves battery life characteristics and charging/discharging efficiency according to a decrease in resistance, as compared to graphite with a high oxygen content, but has low adhesion and uneven coating. However, according to an example of the present disclosure, when a graphite having a low oxygen content per specific surface area and a binder having a low zeta potential are used together as an anode, the adhesion and coating uniformity were much more excellent than the case where a graphite having a low oxygen content per specific surface area and a binder having a high zeta potential are used together.

In addition, a graphite having a high oxygen content per specific surface area has excellent adhesion and coating properties as compared to a graphite having a low oxygen content per specific surface area but has a problem in that it has low charge/discharge characteristics and a low life retention rate due to high resistance. However, although cycle characteristics of a lithium secondary battery are low when a graphite having a high oxygen content per specific surface area and a binder having a low zeta potential are used together, the cycle characteristics were significantly improved when a graphite having a high oxygen content per specific surface area and a binder having a high zeta potential are used together according to an example of the present disclosure.

The value obtained by dividing the absolute value of the zeta potential of the binder by the oxygen content per specific surface area of the anode active material may be preferably in a range from $0.8 \times 10^{-5}$ mV·m²/g to $1.5 \times 10^{-5}$ mV·m²/g, and most preferably from $0.9 \times 10^{-5}$ mV·m²/g to $1.4 \times 10^{-5}$ mV·m²/g.

The anode slurry composition for secondary batteries according to the present disclosure includes the binder for secondary batteries according to the present disclosure and active material particles secured by the binder for secondary batteries.

An amount of the binder for secondary batteries may range from 0.1 parts by weight to parts by weight with respect to 100 parts by weight of the anode slurry composition. If it is less than 0.1 parts by weight, an adhesive force is poor, and if it is more than 10 parts by weight, a battery capacity may be reduced.

In such a case, the amount of the binder for secondary batteries refers to an amount of the binder in the anode slurry composition excluding water.

The anode slurry composition according to the present disclosure may further include carboxymethyl cellulose (CMC). The carboxymethyl cellulose may serve as a dispersant and a thickener for the anode slurry composition. The carboxymethyl cellulose is preferably mixed with SBR (Styrene Butadiene Rubber) to be used, and in this case, it is possible to substantially minimize the amount of the anode binder according to the present disclosure and improve adhesion at the same time.

A molecular weight of the carboxymethyl cellulose may range from 500,000 g/mol to 900,000 g/mol.

The anode slurry composition according to an embodiment of the present disclosure improves phase stability in an aqueous slurry system and allows uniform coating on a surface of an electrode active material by limiting the value obtained by dividing the zeta potential of the binder by the oxygen content per specific surface area of the anode active material, and thus the binder for secondary batteries may be bonded to particles of the electrode active material with high strength.

Another aspect of the present disclosure relates to an anode for secondary batteries prepared of the anode slurry composition for secondary batteries according to an example of the present disclosure.

In the anode for secondary batteries according to the present disclosure, the anode slurry composition for secondary batteries may be formed on an electrode current collector. Specifically, an electrode active material and a conductive material may be bonded to a current collector by the anode binder for secondary batteries, and thus an anode may be formed.

The anode for secondary batteries may be prepared, for example, by coating an anode slurry, which is a mixture of distilled water, an anode active material, a conductive material, carboxymethyl cellulose, and the binder for secondary batteries, on a conductive current collector through doctor blade, immersion, brush coating, and the like, and then drying at 80° C. to 150° C. for 5 minutes to 60 minutes. A solid amount of the slurry may range from 20 wt % to 80 wt %, and a thickness of the anode after drying may range from 20 μm to 150 μm.

The anode for secondary batteries may have an adhesive force ranging from 5 gf/mm to 30 gf/mm, and preferably 10 gf/mm to 30 gf/mm, when a 180° peel strength is measured at a rate of 100 mm/min using UTM (20 kgf Load Cell).

Another aspect of the present disclosure relates to a lithium secondary battery including the anode for secondary batteries of the present disclosure, a cathode, a separator disposed between the cathode and the anode, and an electrolyte.

The cathode includes a current collector and a cathode active material layer formed on the current collector.

As the cathode active material, a compound (lithiated intercalation compound) that may allow reversible intercalation and deintercalation of lithium may be used. Specifically, at least one of composite oxides comprising metals of cobalt, manganese, nickel, aluminum, iron, magnesium, vanadium, and a combination thereof and lithium may be used.

The cathode active material layer also includes a binder and a conductive material.

The binder serves to facilitate attachment between particles of the cathode active material and attachment of the cathode active material to the current collector. Representative examples thereof may include polyvinyl alcohol, carboxymethyl cellulose, hydroxypropyl cellulose, diacetyl cellulose, polyvinyl chloride, carboxylated polyvinyl chloride, polyvinyl fluoride, polymers including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but the present disclosure is not limited thereto.

The conductive material is used to impart conductivity to the electrode and any electronically conductive material that does not cause chemical changes in the battery may be used. For example, natural graphite, artificial graphite, carbon black, acetylene black, Ketjen black, carbon fiber, metal powders such as copper, nickel, aluminum, and silver, metal fibers, and the like may be used, and conductive materials such as polyphenylene derivatives may be used alone or in combination of two or more.

When the cathode active material layer includes the conductive material, a weight ratio of the cathode active material, the conductive material and the cathode binder may be in a range from 94 to 99:0.01 to 5:1 to 5, and preferably 96 to 98:0.5 to 3:0.5 to 3.

Al may be used as the current collector, but the present disclosure is not limited thereto.

The anode and the cathode are respectively prepared by mixing the active material, the conductive material, and the binder in a solvent to prepare an active material composition and coating the composition to the current collector. Such a method of manufacturing an electrode is widely known in the art, and thus a detailed description thereof will be omitted herein. As the solvent, N-methylpyrrolidone, distilled water, and the like may be used, but the present disclosure is not limited thereto.

The electrolyte includes a non-aqueous organic solvent and a lithium salt.

The non-aqueous organic solvent serves as a medium through which ions involved in electrochemical reaction of the battery may move.

As the non-aqueous organic solvent, a carbonate-based, ester-based, ether-based, ketone-based, alcohol-based, or aprotic solvent may be used.

The non-aqueous organic solvent may be used alone or in combination of two or more. When two or more are mixed and used, a mixing ratio may be appropriately adjusted according to the desired battery performance.

The lithium salt is dissolved in the non-aqueous organic solvent, acts as a source of lithium ions in the battery, enables basic operation of the lithium secondary battery, and promotes movement of lithium ions between the cathode and the anode. Representative examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(CxF_{2x}+1SO_2)(CyF_{2y}+1SO_2)$ (where x and y are natural numbers), LiCl, LiI, $LiB(C_2O_4)_2$ (LiBOB, lithium bis(oxalato) borate) or a combination thereof, and these are included as a supporting electrolytic salt.

The separator may use any separator commonly used in lithium batteries that separates the anode and the cathode and provides a movement path for lithium ions to move therethrough. That is, those having low resistance to ion movement of the electrolyte and having excellent electrolyte moisture content capability may be used. For example, the separator may be selected from glass fiber, polyester, Teflon, polyethylene, polypropylene, polytetrafluoroethylene (PTFE), or a combination thereof, and it may be in the form of a non-woven fabric or a woven fabric. For example, a polyolefin-based polymer separator such as polyethylene and polypropylene is largely used for a lithium ion battery, and a coated separator including a ceramic component or a polymer material may be used to secure heat resistance or mechanical strength, and optionally, a single layer or a multilayer structure may be used.

The lithium secondary battery according to the present disclosure may be used not only as a battery cell used as a power source for a small device, but also as a unit cell for a medium- or large-sized battery module including a plurality of battery cells used as a power source for a medium- or large-sized device.

Preferred examples of the medium- and large-sized device may include a power tool powered by a battery motor; electric vehicles such as electric vehicles (EV), hybrid electric vehicles (HEV), and plug-in hybrid electric vehicles (PHEV); electric two-wheeled vehicles such as electric bicycles (E-bike) and electric scooters (E-scooter); and an electric golf cart, but the present disclosure is not limited thereto.

Hereinafter, the present disclosure will be described in more detail through specific embodiments. The described embodiments are only provided by way of example, and the scope of the present disclosure is not limited thereto. Details that may be sufficiently technically inferred by those skilled in the art will be omitted herein.

In Examples and Experimental Examples, "%" shall mean "wt %" unless otherwise specified.

Example 1

Preparation of Anode Binder for Secondary Battery

After adding 200 parts by weight of distilled water, a monomer mixture, and 1 part by weight of sodium dodecylbenzene sulfonate as an anionic surfactant with respect to 100 parts by weight of the monomer mixture and emulsifying the mixture, 0.5 parts by weight of potassium sulfite was added as a decomposition initiator to perform a continuous emulsion polymerization reaction, and thus an anode binder for secondary batteries was prepared.

The monomer mixture includes 4 parts by weight of itaconic acid, 1 part by weight of acrylonitrile, and 1 part by weight of acrylamide.

Preparation of Anode 97.5 parts by weight of graphite 1 as an anode active material, 1.5 parts by weight of an anode binder for secondary batteries, and 1.0 parts by weight of carboxylmethyl cellulose were mixed with distilled water, and then stirred using a mechanical stirrer for 30 minutes to prepare an anode slurry composition. The anode slurry composition was uniformly coated to a Cu thin film having a thickness of 10 μm using an applicator and dried, and thus an anode was prepared. In such a case, a temperature and a time for drying were 120° C. and 15 minutes, respectively.

Preparation of Battery

A lithium nickel-cobalt-manganese (1:1:1) oxide as a cathode active material, carbon black as a conductive material, and polyvinylidene fluoride (PVDF) as a cathode binder are mixed in a weight ratio of 95:2.5:2.5 to prepare a cathode active material slurry. Then, the cathode active material slurry was coated to an aluminum current collector, and thus a cathode was prepared. An electrolyte was prepared by dissolving $LiPF_6$ to a concentration of 1 M in a non-aqueous solvent containing ethylene carbonate (EC):ethylmethyl carbonate (EMC):diethyl carbonate (DEC) in a composition ratio of 1:2:1. As a separator, a porous polyethylene film was used, and thus a full cell of a lithium secondary battery was prepared.

Example 2

A full cell of a lithium secondary battery was prepared in the same conditions and method as in Example 1, except that the itaconic acid content in the monomer mixture was 2 parts by weight and graphite 2 was used when preparing the anode.

Example 3

A full cell of a lithium secondary battery was manufactured under the same conditions and methods as in Example 1, except that graphite 4 was used when preparing the anode.

Example 4

A full cell of a lithium secondary battery was manufactured under the same conditions and methods as in Example 2, except that graphite 3 was used when preparing the anode.

Comparative Example 1

A full cell of a lithium secondary battery was manufactured under the same conditions and methods as in Example 1, except that graphite 2 was used when preparing the anode.

Comparative Example 2

A full cell of a lithium secondary battery was manufactured under the same conditions and methods as in Example 2, except that graphite 1 was used when preparing the anode.

Comparative Example 3

A full cell of a lithium secondary battery was manufactured under the same conditions and methods as in Example 1, except that graphite 3 was used when preparing the anode.

Comparative Example 4

A full cell of a lithium secondary battery was manufactured under the same conditions and methods as in Example 2, except that graphite 4 was used when preparing the anode.

The graphite 1, the graphite 2, the graphite 3, and the graphite 4 represent respective graphite having the characteristics shown in Table 1 below.

TABLE 1

| Classification | Specific surface area (m$^2$/g) | Oxygen content (ppm) | Oxygen content per specific surface area (g/m$^2$) |
|---|---|---|---|
| Graphite 1 | 1.14 | 390 | $3.4 \times 10^{-4}$ |
| Graphite 2 | 1.02 | 150 | $1.5 \times 10^{-4}$ |
| Graphite 3 | 2.35 | 380 | $1.6 \times 10^{-4}$ |
| Graphite 4 | 1.09 | 320 | $2.9 \times 10^{-4}$ |

Components and contents of the anode binders of Examples 1 to 4 and the type of the anode active material are as shown in Table 2 below.

TABLE 2

| Classification | Content (parts by weight) | Example 1 | Example 2 | Example 3 | Example 4 |
|---|---|---|---|---|---|
| Anode binder | Itaconic acid | 4 | 2 | 4 | 2 |
| | Acrylonitrile | 1 | 1 | 1 | 1 |
| | Acrylamide | 1 | 1 | 1 | 1 |
| Anode active material | Graphite | Graphite 1 | Graphite 2 | Graphite 4 | Graphite 3 |

Components and contents of the anode binders of Comparative Examples 1 to 4 and the type of the anode active material are as shown in Table 3 below.

TABLE 3

| Classification | Content (parts by weight) | Comp. Example 1 | Comp. Example 2 | Comp. Example 3 | Comp. Example 4 |
|---|---|---|---|---|---|
| Anode binder | Itaconic acid | 4 | 2 | 4 | 2 |
| | Acrylonitrile | 1 | 1 | 1 | 1 |
| | Acrylamide | 1 | 1 | 1 | 1 |
| Anode active material | Graphite | Graphite 2 | Graphite 1 | Graphite 3 | Graphite 4 |

Experimental Example 1: Measurement of Zeta Potential of Binder

A zeta potential of each of the binders prepared in Examples 1 to 4 and Comparative Examples 1 to 4 was measured at room temperature, and the results are shown in Table 4 below.

Experimental Example 2: Measurement of Adhesive Force of Anode

Each of the anodes prepared in Examples 1 to 4 and Comparative Examples 1 to 4 was cut to a size of 25 mm in width and 100 mm in length to prepare each specimen. A double-sided tape having a width of 20 mm and a length of 40 mm was attached to an acrylic plate having a width of 40 mm and a length of 100 mm. After attaching the prepared electrode on the double-sided tape, it was lightly pressed 5 times with a hand roller. After placing each of the specimens to a UTM (20 kgf Load Cell) and peeling off a part of the anode about 25 mm, the anode was secured to an upper clip of a tensile strength apparatus and the tape attached to one side of the anode was secured to a lower clip and an adhesive force was measured as 180° peeling strength while peeling at a rate of 100 mm/min. Five or more specimens per sample were prepared and measured, an average value was calculated, and the results are shown in Table 4 below.

TABLE 4

| | Binder properties Zeta potential (-mV) | Classification | Specific surface area ($m^2/g$) | Oxygen content (ppm) | Oxygen content per specific surface area ($g/m^2$) | Zeta potential/ Oxygen content per specific surface area | Anode adhesion (gf/mm) |
|---|---|---|---|---|---|---|---|
| | | Graphite properties | | | | | |
| Example 1 | 40 | Graphite 1 | 1.14 | 390 | $3.4 \times 10^{-4}$ | $1.2 \times 10^5$ | 28.1 |
| Example 2 | 16 | Graphite 2 | 1.02 | 150 | $1.5 \times 10^{-4}$ | $1.1 \times 10^5$ | 21.5 |
| Example 3 | 40 | Graphite 4 | 1.09 | 320 | $2.9 \times 10^{-4}$ | $1.4 \times 10^5$ | 25.4 |
| Example 4 | 16 | Graphite 3 | 2.35 | 380 | $1.6 \times 10^{-4}$ | $9.9 \times 10^4$ | 19.1 |
| Comparative Example 1 | 40 | Graphite 2 | 1.02 | 150 | $1.5 \times 10^{-4}$ | $2.7 \times 10^5$ | 19.9 |
| Comparative Example 2 | 16 | Graphite 1 | 1.14 | 390 | $3.4 \times 10^{-4}$ | $4.7 \times 10^4$ | 17.3 |
| Comparative Example 3 | 40 | Graphite 3 | 2.35 | 380 | $1.6 \times 10^{-4}$ | $2.5 \times 10^5$ | 22.7 |
| Comparative Example 4 | 16 | Graphite 4 | 1.09 | 320 | $2.9 \times 10^{-4}$ | $5.5 \times 10^4$ | 15.4 |

Experimental Example 3: Measurement of Coating Stability

The anodes prepared in Examples 1 to 4 and Comparative Examples 1 to 4 were collected in a circular shape having a diameter of 16 mm, and a mass and a thickness of each anode were measured, and a density was calculated from this. After measuring a total of 10 times, an average density and a standard deviation were calculated, and the results are shown in Table 5 below and FIG. 1.

TABLE 5

| $g/cm^3$ | Example 1 | Example 2 | Example 3 | Example 4 | Comp. Example1 | Comp. Example 2 | Comp. Example 3 | Comp. Example 4 |
|---|---|---|---|---|---|---|---|---|
| Average | 10.44 | 10.84 | 10.46 | 10.3 | 9.98 | 10.41 | 10.58 | 10.24 |
| Standard deviation | 0.29 | 0.25 | 0.30 | 0.29 | 0.67 | 0.31 | 0.50 | 0.38 |

As a result of the experiment, as shown in Table 4, it was appreciated that although the graphite having a low oxygen content per specific surface area (e.g., graphite 2, graphite 3) was used, the adhesive force was high if it was used with the binder having a low zeta potential (e.g., Example 2, Example 4), as compared to the case where the graphite having a low oxygen content per specific surface area was used with the binder having a high zeta potential (e.g., Comparative Example 1, Comparative Example 3).

In addition, as shown in Table 5, it was appreciated that the anode of Example 2 has a lower standard deviation of density, thus having much more excellent coating uniformity, as compared to the anode of Comparative Example 1, and the anode of Example 4 has a lower standard deviation of density, thus having much more excellent coating uniformity, as compared to the anode of Comparative Example 3.

Accordingly, it may be appreciated that a graphite having a low oxygen content has excellent compatibility with a binder having a low zeta potential.

Experimental Example 4: Measurement of Rate Capability

Figure 2:
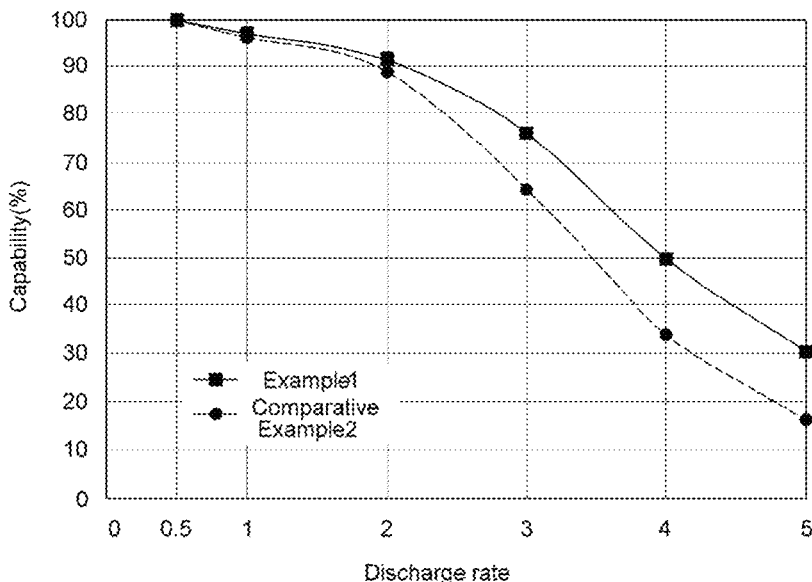
FIG. 2 illustrates results of measuring rate capability of lithium secondary batteries prepared in Example 1 and Comparative Example 2.

The lithium secondary batteries prepared in Example 1 and Comparative Example 2 were discharged under each condition of 0.5 C, 1 C, 2 C, 3 C, 4 C, and 5 C to measure a discharge capacity, and the results are shown in FIG. 2.

As illustrated in FIG. 2, it was appreciated that the lithium secondary battery of Example 1 in which the graphite having a high oxygen content per specific surface area and the binder having a high zeta potential are used has excellent rate capability as compared to the lithium secondary battery of Comparative Example 2 in which the graphite having a high oxygen content per specific surface area and the binder having a low zeta potential are used.

Experimental Example 5: Measurement of Cycle Characteristics

Figure 3:
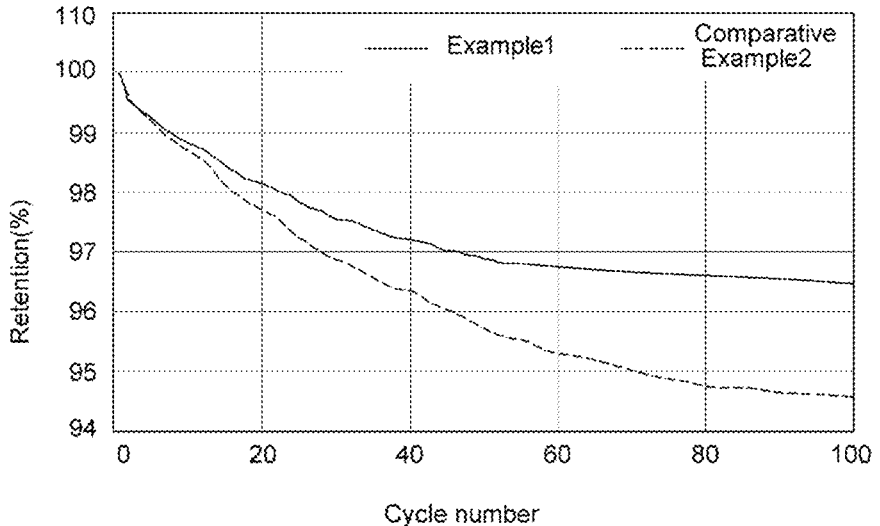
FIG. 3 illustrates results of evaluating cycle characteristics of the lithium secondary batteries prepared in Example 1 and Comparative Example 2.

The lithium secondary batteries prepared in Example 1 and Comparative Example 2 were charged to CC-CV 4 A, 4.2 V, 1 C, 0.05 C cut-off at 25° C. and then discharged to CC 1 C and 2.7 V cut-off repeatedly from 1 cycle to 100 cycles, and changes in capacity were measured up to 100 cycles, and the results are shown in FIG. 3.

As a result of the experiment, as shown in FIG. 3, the lithium secondary battery of Comparative Example 2 in which the graphite having a high oxygen content per specific surface area and the binder having a low zeta potential were used together had low cycle characteristics, but the lithium secondary battery of Example 1 in which the graphite having a high oxygen content per specific surface area and the binder having a high zeta potential were used together had significantly high cycle characteristics Accordingly, it was appreciated that when a graphite having a high oxygen content and a binder having a high zeta potential are used together, charge/discharge characteristics and life retention rate may be improved.

What is claimed is:

1. An anode slurry composition for secondary batteries, comprising:

an anode active material; and a binder comprising a copolymer of (meth)acrylic acid monomer, acrylonitrile-based monomer, and (meth) acrylamide monomer, wherein a value obtained by dividing an absolute value of a zeta potential of the binder by an oxygen content per specific surface area of the anode active material is in a range from $0.6\times10^{-5}$ mV·m$^2$/g to $2.0\times10^{-5}$ mV·m$^2$/g.

2. The anode slurry composition for secondary batteries of claim 1, wherein the anode active material is at least one anode active material selected from the group consisting of natural graphite, artificial graphite, expanded graphite, carbon fiber, non-graphitizable carbon, carbon black, carbon nanotube, fullerene, activated carbon, hard carbon and soft carbon.

3. The anode slurry composition for secondary batteries of claim 1, wherein the anode active material has an oxygen content per specific surface area ranging from $1.0\times10^{-4}$ g/m$^2$ to $4.0\times10^{-4}$ g/m$^2$.

4. The anode slurry composition for secondary batteries of claim 1, wherein an amount of the (meth)acrylic acid monomer ranges from 0.5 to 10 wt %; an amount of the (meth)acrylamide monomer ranges from 0.5 to 3 wt %; and an amount of the (meth)acrylonitrile-based monomer ranges from 0.5 to 5 wt %, with respect to the total weight of the binder.

5. The anode slurry composition for secondary batteries of claim 1, wherein the binder has the absolute value of the zeta potential ranging from 5 to 50 mV.

6. The anode slurry composition for secondary batteries of claim 1, wherein the (meth)acrylic acid monomer is at least one monomer selected from the group consisting of acrylic acid, methacrylic acid, itaconic acid, fumaric acid, maleic acid, citraconic acid, methaconic acid, clutaconic acid, tetrahydrophthalic acid, crotonic acid, and isocrotonic acid.

7. The anode slurry composition for secondary batteries of claim 1, wherein the (meth)acrylonitrile-based monomer is acrylonitrile, methacrylonitrile, or a combination thereof.

8. The anode slurry composition for secondary batteries of claim 1, wherein the (meth)acrylamide monomer is at least one monomer selected from the group consisting of acrylamide, methacrylamide, n-methylolacrylamide, and n-butoxymethylacrylamide.

9. The anode slurry composition for secondary batteries of claim 1, wherein an amount of the anode active material ranges from 90 parts by weight to 99 parts by weight with respect to 100 parts by weight of the anode slurry composition.

10. The anode slurry composition for secondary batteries of claim 1, wherein an amount of the binder ranges from 0.1 parts by weight to 10 parts by weight with respect to 100 parts by weight of the anode slurry composition.

11. An anode for secondary batteries produced by using the anode slurry composition for secondary batteries according to claim 1.

12. The anode for secondary batteries of claim 11, wherein the anode has an adhesive force ranging from 5 gf/mm to 30 gf/mm.

13. A lithium secondary battery comprising:

the anode for secondary batteries of claim 11;

a cathode;

a separator disposed between the cathode and the anode; and an electrolyte.

* * * * *